Feb. 12, 1929.
A. GUERRA
1,701,774
CURRENT LIMITING AND REGULATING APPARATUS
Filed Nov. 12, 1925
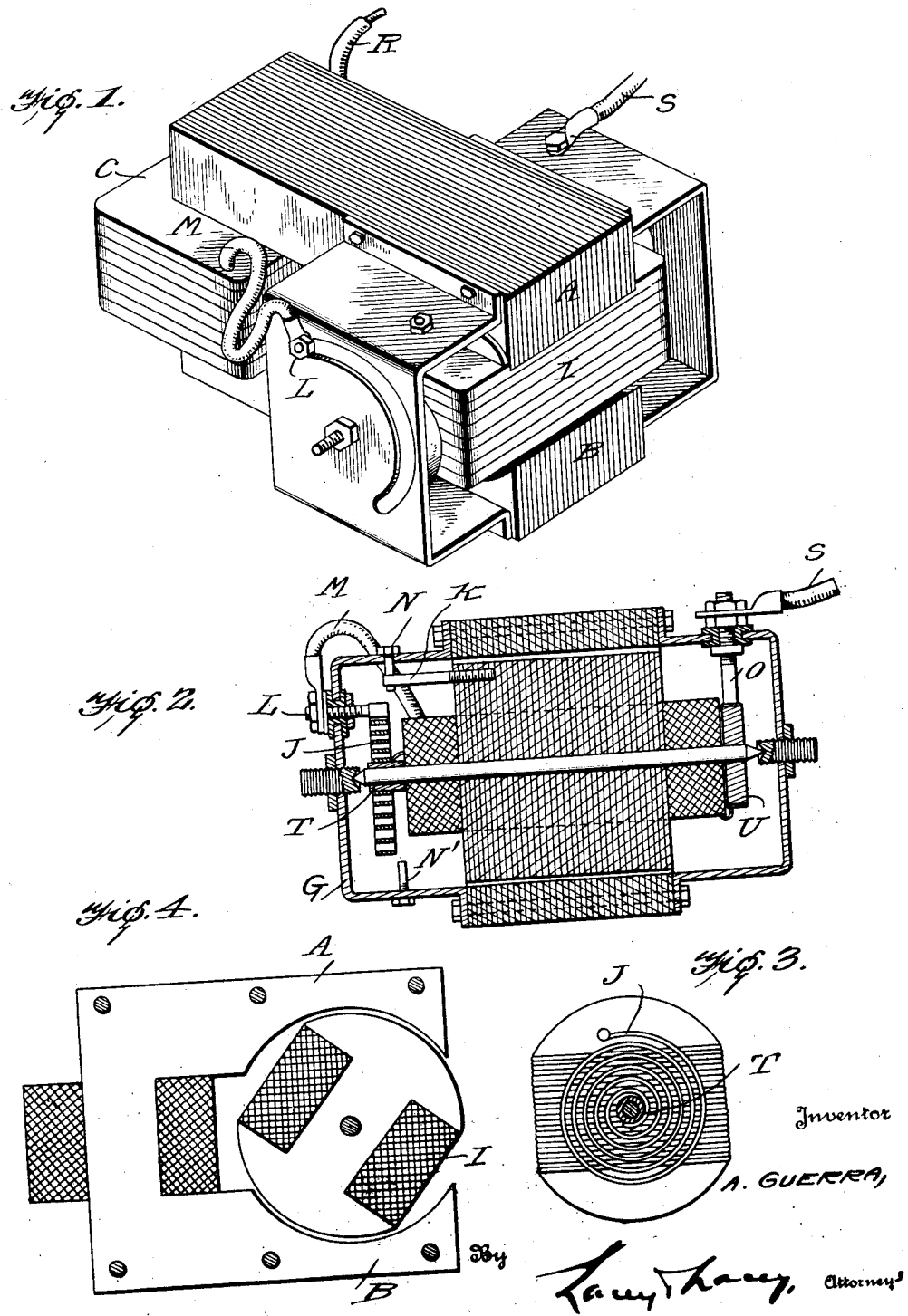

Patented Feb. 12, 1929.

1,701,774

UNITED STATES PATENT OFFICE.

ANGEL GUERRA, OF MEXICO CITY, MEXICO.

CURRENT LIMITING AND REGULATING APPARATUS.

Application filed November 12, 1925. Serial No. 68,676.

The present invention relates to improvements in protective electrical apparatus which are used to limit the value of alternating current in a given circuit.

An object of the invention is to prevent excessive current in an alternating current circuit due to overloads, and with a minimum of time lag, and to provide a device which is self restoring in nature.

A further object of the invention is to maintain at a constant predetermined value, the alternating current flowing in a circuit which requires a non-fluctuating current.

It has several distinct features: First, it limits the value of an alternating electric current, by automatically varying the value of a reactance connected in series with a circuit, inversely as the value of the impedance of the circuit. In that way the value of the current flowing through the circuit can not exceed the limit fixed by the apparatus, no matter what the value of the impedance or ohmic resistance of the rest of the circuit may be, the device constituting a protection for the power companies in their power and lighting circuits, and also an effective protection for electric motors from overloads; and superceding auto-starters and circuit-breakers in their purpose of limiting the starting and load current respectively in the circuit of a motor. Second, it does not break the circuit when the value of the current tends to be exceeded, thereby avoiding the production of an arc between the breaking contacts, and the corresponding troubles developed from this cause in all the known types of apparatus for a similar purpose. Third, the device is useful in circuits where constancy of current and continuous operation are essential, e. g. in radio power tube, X-ray work where alternating currents are used to energize the cathodes.

In such cases trouble results from voltage fluctuations in the line which, even if slight, cause certain objectionable operating conditions due to the above normal or below normal heating of the cathode, as the case may be, while if the fluctuations cause the current to rise above normal very considerably, a burning out of the filament or at least shortening of its life may result. Tungsten filaments have a negative thermal coefficient of resistance, making it necessary to carefully cut out resistance to bring the tube into operation to prevent an excessive current flow when the filament is cold. The present invention automatically takes care of this preliminary rush of current, and brings the tube up to normal without repeated attention by an attendant.

Furthermore, the trouble and expense of replacing fuses, and the necessity of throwing in circuit breakers is obviated. There is always the objectionable time lag involved in the case of fuses, and circuit breakers are marginal trigger protective devices, in that the current must rise above normal to a given amount before they operate, according to the usual manner of setting.

These results are obtained by means of the device illustrated in the accompanying drawings, of which,—

Figure 1 is an isometric projection of the apparatus,

Figure 2 is a vertical section which shows the moving element pivoted on both ends to enable it to rotate freely, Figure 3 is an end view of the moving element or armature, and Figure 4 shows the shape of the stampings which form the field and armature cores.

Each of the two coils of equal inductance, C and I, Figures 1 and 4, is wound around the field and armature core respectively: The circuit includes the following elements, cable R, field coil C, cable M, binding post L, spiral spring J, armature coil I, ring U, brush O, and cable S. Ring U, is insulated from shaft by a fiber washer and connected to one end of coil I, while the other end of this coil is connected at the insulated sleeve T to the inside end of spiral spring J, Figures 1, 2 and 3.

The tension of the spring can be varied at will by changing the position of binding post L, in the slot A—A, varying in that way the value of the current necessary to start the armature. For larger sizes a pulley cord and weight can be used to balance the torque, and starting current will be fixed by the amount of weight hanging from the cord.

Pin K, Figure 2, screwed in the armature core by reaching the stops N—N', screwed on end plate G, limits the angle of rotation of the armature.

When the apparatus is connected in series in a line and a current flows through it, magnetic fields are created in both cores which, in the normal position of the apparatus at an angle of about 45° from the center line of the pole pieces A and B of the field core, oppose each other. This opposition of magnetic fields causes a torque to be developed in the armature tending to rotate it, but which is balanced by the tension of the spring J as long as the value of the current flowing through the coils does not exceed the predetermined value for which the spring tension has been set. The value of the combined reactance is in this position very low, nearly zero.

As the value of the current is exceeded, the torque exceeds the tension of the spring and the armature is rotated but the value of the reactance is no longer a minimum, since the two opposing magnetic field poles of the fixed and moving coils are no longer directly opposite to each other. The angle rotated by the armature will increase as the overload increases, and so will the reactance. On short circuit the angle of rotation will be about 135° and the reactance will reach its maximum value at which the impedance of the circuit will limit the value of the current to the predetermined one.

The pin N is placed just a little past dead center or point of minimum reactance, in the direction of rotation, to prevent the armature rotating with the torque of the spring. Pin N' is not so essential as N, since it merely prevents the momentum carrying the armature past the point of maximum reactance. On short circuit, the armature would come to rest at this point anyway, after oscillating several times. This would cause objectionable fluctuations. Well known damping means could be used to advantage to prevent damage to the pins, and to prevent fluctuations caused by the momentum of the armature.

In the case where the device is to be used to maintain constancy of current which is subject to fluctuating line voltages, the design of the device, and the setting of the spring should be such that the armature lies at a balance at some angle between 45° and 135° for a given normal current value. This will permit the reactance to decrease with a decrease of current, as well as increase when the current rises. Thus, the current would remain practically constant, and at the same time the circuit would be protected from overload. The inherent inductance in any given position of the armature will set up reactance like any fixed choke coil to take care of fluctuations which are too rapid for the armature to respond to simultaneously by its rotation. Hence, this device is much more effective than a fixed iron core choke coil since it has a much greater inductance range, and a much higher ratio of reactance to current. A considerable amount of the effectiveness of the device may be attributed to the fact that as the armature rotates from 45° to 90° the flux leakage increases with increase of air gap, thereby adding to the inductance. There are several factors then which function to maintain constancy, namely, the normal reactance of the device at any intermediate position at any given instant and the increased reactance due to the rotation of the armature to a position of more or less inductance as the case may be, this being augmented by a change of leakage flux. The great inductance range also permits the same device to function as a self restoring current limiting device in the case of excessive voltages, overloads, or short circuits, while normally permitting normal operation with a small amount of reactance in the circuit, which is desirable usually.

From the foregoing description of my invention, other modifications will suggest themselves to those skilled in the art, and I do not therefore limit myself to the exact structural details above set forth.

Having thus described the invention, I claim:

A current limiting device comprising a core having pole portions, a field coil on said core, an armature coil between said pole portions, means for mounting said armature coil for rotation including a plate fixed to said core and having an arcuate slot, a member adjustable in said slot, and a spiral spring connecting said member and armature coil mounting means, said coils being connected electrically through said member and spring.

In testimony whereof I affix my signature.

ANGEL GUERRA. [L. S.]